US008614526B2

(12) United States Patent
Cook et al.

(10) Patent No.: US 8,614,526 B2
(45) Date of Patent: Dec. 24, 2013

(54) SYSTEM AND METHOD FOR MAGNETIC POWER TRANSFER

(75) Inventors: Nigel P. Cook, El Cajon, CA (US); Stephen Dominiak, Mägenwil (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/233,441

(22) Filed: Sep. 18, 2008

(65) Prior Publication Data

US 2009/0102292 A1 Apr. 23, 2009

Related U.S. Application Data

(60) Provisional application No. 60/973,711, filed on Sep. 19, 2007.

(51) Int. Cl.
*H04B 5/00* (2006.01)
*H04B 1/02* (2006.01)

(52) U.S. Cl.
USPC .......... 307/104

(58) Field of Classification Search
USPC .......... 307/104
See application file for complete search history.

(56) References Cited

U.S. PATENT DOCUMENTS

| | | | | |
|---|---|---|---|---|
| 4,469,748 | A * | 9/1984 | Sharma | 428/378 |
| 4,631,449 | A * | 12/1986 | Peters, Jr. | 315/205 |
| 4,870,245 | A * | 9/1989 | Price et al. | 219/121.36 |
| 5,678,182 | A * | 10/1997 | Miller et al. | 455/12.1 |
| 5,759,876 | A * | 6/1998 | Singlevich et al. | 438/131 |
| 5,857,155 | A * | 1/1999 | Hill et al. | 455/456.3 |
| 5,864,764 | A * | 1/1999 | Thro et al. | 455/561 |
| 5,910,799 | A * | 6/1999 | Carpenter et al. | 715/866 |
| 5,940,509 | A * | 8/1999 | Jovanovich et al. | 713/191 |
| 6,072,383 | A * | 6/2000 | Gallagher et al. | 340/10.2 |
| 6,228,773 | B1 * | 5/2001 | Cox | 438/707 |
| 6,273,956 | B1 * | 8/2001 | Cox | 118/719 |
| 6,484,029 | B2 * | 11/2002 | Hughes et al. | 455/434 |
| 6,539,230 | B2 * | 3/2003 | Yen | 455/456.1 |
| 6,636,146 | B1 | 10/2003 | Wehoski | |
| 6,737,884 | B2 * | 5/2004 | Shigemasa et al. | 326/38 |
| 6,848,616 | B2 * | 2/2005 | Tsirline et al. | 235/449 |
| 6,967,462 | B1 | 11/2005 | Landis | |
| 6,976,998 | B2 * | 12/2005 | Rizzo et al. | 623/6.63 |
| 6,983,156 | B2 * | 1/2006 | Fukushima et al. | 455/456.1 |

(Continued)

FOREIGN PATENT DOCUMENTS

| | | | |
|---|---|---|---|
| CN | 1214136 | A | 4/1999 |
| JP | 2004274723 | A | 9/2004 |

(Continued)

OTHER PUBLICATIONS

"Wireless Non-Radiative Energy Transfer", MIT paper, publication and date unknown, believed to be 2007.

(Continued)

*Primary Examiner* — Adi Amrany
(74) *Attorney, Agent, or Firm* — Knobbe Martens Olson & Bear LLP

(57) ABSTRACT

System and method for wireless power transfer based on values set to comply with limits from multiple different agencies.

34 Claims, 1 Drawing Sheet

(56) References Cited

U.S. PATENT DOCUMENTS

| | | | | |
|---|---|---|---|---|
| 6,992,567 | B2 * | 1/2006 | Cole et al. | 340/10.1 |
| 7,014,103 | B2 * | 3/2006 | Fernandez | 235/375 |
| 7,173,518 | B2 * | 2/2007 | Hulvey | 340/10.31 |
| 7,180,421 | B2 * | 2/2007 | Pahlaven et al. | 340/572.1 |
| 7,191,245 | B2 * | 3/2007 | Takayama | 709/231 |
| 7,212,122 | B2 * | 5/2007 | Gloekler et al. | 340/572.1 |
| 7,309,002 | B2 * | 12/2007 | Fernandez | 235/376 |
| 7,311,851 | B2 * | 12/2007 | Carr | 216/63 |
| 7,325,147 | B2 * | 1/2008 | Satoh et al. | 713/300 |
| 7,426,396 | B2 * | 9/2008 | Iwasaki et al. | 455/456.1 |
| 7,443,057 | B2 | 10/2008 | Nunally | |
| 7,456,743 | B2 * | 11/2008 | Malacarne et al. | 340/572.1 |
| 7,461,613 | B2 * | 12/2008 | Sinclair et al. | 116/234 |
| 7,582,518 | B2 * | 9/2009 | Dang et al. | 438/182 |
| 7,591,957 | B2 * | 9/2009 | Carr | 216/24 |
| 7,612,675 | B2 * | 11/2009 | Miller et al. | 340/572.3 |
| 7,624,417 | B2 * | 11/2009 | Dua | 725/114 |
| 7,741,734 | B2 * | 6/2010 | Joannopoulos et al. | 307/104 |
| 7,825,543 | B2 | 11/2010 | Karalis et al. | |
| 7,839,124 | B2 * | 11/2010 | Yamazaki et al. | 320/134 |
| 8,010,145 | B2 | 8/2011 | Miyabayashi et al. | |
| 8,169,185 | B2 * | 5/2012 | Partovi et al. | 320/108 |
| 8,204,460 | B2 * | 6/2012 | Rajagopal et al. | 455/127.2 |
| 2004/0108067 | A1 * | 6/2004 | Fischione et al. | 156/345.38 |
| 2004/0227057 | A1 | 11/2004 | Tuominen et al. | |
| 2005/0000656 | A1 * | 1/2005 | Carr | 156/345.48 |
| 2005/0026608 | A1 * | 2/2005 | Kallio et al. | 455/431 |
| 2005/0092838 | A1 * | 5/2005 | Tsirline et al. | 235/449 |
| 2005/0101359 | A1 * | 5/2005 | O'Mahony | 455/575.5 |
| 2005/0131495 | A1 * | 6/2005 | Parramon et al. | 607/61 |
| 2006/0019679 | A1 * | 1/2006 | Rappaport et al. | 455/456.5 |
| 2006/0066443 | A1 * | 3/2006 | Hall | 340/10.5 |
| 2006/0103505 | A1 * | 5/2006 | Hulvey | 340/10.2 |
| 2006/0183462 | A1 * | 8/2006 | Kolehmainen | 455/411 |
| 2006/0189440 | A1 * | 8/2006 | Gravagne | 482/8 |
| 2006/0197939 | A1 * | 9/2006 | Baiker et al. | 356/72 |
| 2006/0258289 | A1 * | 11/2006 | Dua | 455/41.3 |
| 2007/0000321 | A1 * | 1/2007 | Boudaoud et al. | 73/304 R |
| 2007/0010295 | A1 * | 1/2007 | Greene et al. | 455/572 |
| 2007/0038516 | A1 * | 2/2007 | Apple et al. | 705/14 |
| 2007/0073585 | A1 * | 3/2007 | Apple et al. | 705/14 |
| 2007/0109103 | A1 * | 5/2007 | Jedrey et al. | 340/10.5 |
| 2007/0196456 | A1 * | 8/2007 | Stevens et al. | 424/448 |
| 2007/0222542 | A1 * | 9/2007 | Joannopoulos et al. | 333/219 |
| 2007/0250872 | A1 * | 10/2007 | Dua | 725/81 |
| 2007/0290846 | A1 * | 12/2007 | Schilling et al. | 340/572.1 |
| 2007/0293142 | A1 * | 12/2007 | Dehmas et al. | 455/1 |
| 2008/0058029 | A1 * | 3/2008 | Sato et al. | 455/573 |
| 2008/0090520 | A1 * | 4/2008 | Camp et al. | 455/41.2 |
| 2008/0132191 | A1 * | 6/2008 | Quinlan et al. | 455/302 |
| 2008/0200180 | A1 * | 8/2008 | Dunn | 455/456.1 |
| 2008/0210762 | A1 * | 9/2008 | Osada et al. | 235/492 |
| 2008/0211320 | A1 * | 9/2008 | Cook et al. | 307/149 |
| 2008/0223925 | A1 * | 9/2008 | Saito et al. | 235/380 |
| 2008/0266060 | A1 * | 10/2008 | Takei | 340/10.4 |
| 2009/0015075 | A1 * | 1/2009 | Cook et al. | 307/149 |
| 2009/0114145 | A1 * | 5/2009 | Sinclair et al. | 116/234 |
| 2009/0284245 | A1 | 11/2009 | Kirby et al. | |
| 2009/0305742 | A1 * | 12/2009 | Caballero et al. | 455/566 |
| 2010/0038970 | A1 | 2/2010 | Cook et al. | |

FOREIGN PATENT DOCUMENTS

| | | | |
|---|---|---|---|
| JP | 2005518030 | A | 6/2005 |
| JP | 2005208754 | A | 8/2005 |
| JP | 2006513594 | A | 4/2006 |
| JP | 2006319991 | A | 11/2006 |
| JP | 2007034385 | A | 2/2007 |
| KR | 102000017058 | | 3/2000 |
| KR | 1020010030472 | | 4/2001 |
| KR | 20010069038 | A | 7/2001 |
| KR | 20060082433 | A | 7/2006 |
| WO | WO03069538 | A1 | 8/2003 |
| WO | WO2004027681 | A2 | 4/2004 |
| WO | 2007084716 | A2 | 7/2007 |

OTHER PUBLICATIONS

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

Scheible, et al., "Novel wireless power supply system for wireless communication devices in industrial automation systems", IECON 02, IEEE 2002 28th Annual Conference of the Industrial Electronics Society, 2002, vol. 2, pp. 1358-1363.

International Search Report and Written Opinion—PCT/US2008/076899, International Search Authority—European Patent Office—Jan. 8, 2009

* cited by examiner

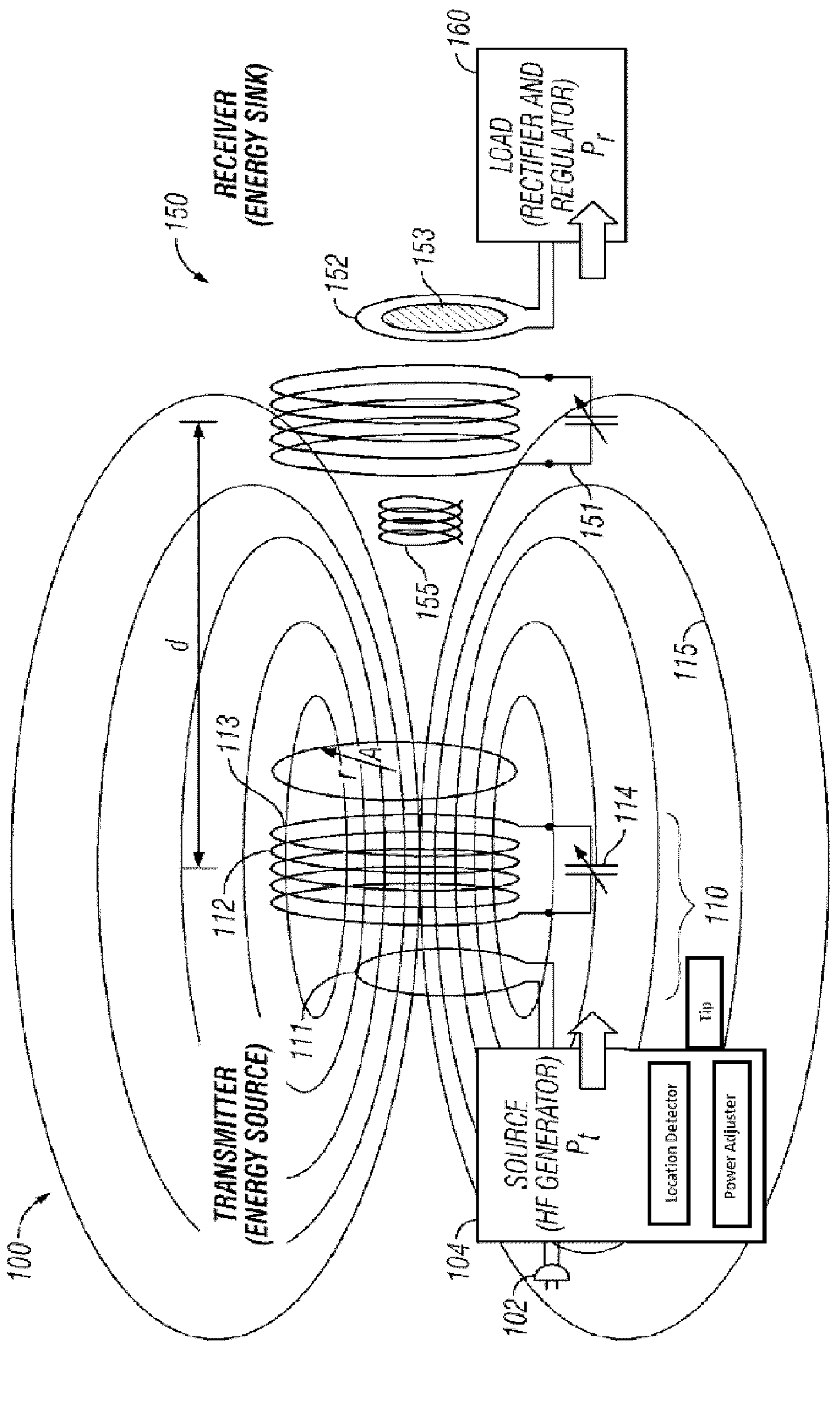
100
150
RECEIVER
(ENERGY SINK)
160
LOAD
(RECTIFIER AND
REGULATOR)
$P_r$
152
153
d
155
151
115
113
112
111
r
A
114
110
Tip
TRANSMITTER
(ENERGY SOURCE)
SOURCE
(HF GENERATOR)
$P_t$
Location Detector
Power Adjuster
104
102

SYSTEM AND METHOD FOR MAGNETIC POWER TRANSFER

This application claims priority from provisional application No. 60/973,711, filed Sep. 19, 2007, the entire contents of which disclosure is herewith incorporated by reference.

BACKGROUND

It is desirable to transfer electrical energy from a source to a destination without the use of wires to guide the electromagnetic fields. A difficulty of previous attempts has delivered low efficiency together with an inadequate amount of delivered power.

Our previous applications and provisional applications, including, but not limited to, U.S. patent application Ser. No. 12/018,069, filed Jan. 22, 2008, entitled "Wireless Apparatus and Methods", the entire contents of the disclosure of which is herewith incorporated by reference, describe wireless transfer of power.

The system can use transmit and receiving antennas that are preferably resonant antennas, which are substantially resonant, e.g., within 5-10% of resonance, 15% of resonance, or 20% of resonance. The antenna(s) are preferably of a small size to allow it to fit into a mobile, handheld device where the available space for the antenna may be limited. An efficient power transfer may be carried out between two antennas by storing energy in the near field of the transmitting antenna, rather than sending the energy into free space in the form of a travelling electromagnetic wave. Antennas with high quality factors can be used. Two high-Q antennas are placed such that they react similarly to a loosely coupled transformer, with one antenna inducing power into the other. The antennas preferably have Qs that are greater than 1000.

SUMMARY

The present application describes transfer of energy from a power source to a power destination via electromagnetic field coupling.

Embodiments describe forming systems and antennas that maintain output and power transfer at levels that are allowed by governmental agencies.

BRIEF DESCRIPTION OF THE DRAWINGS

These and other aspects will now be described in detail with reference to the accompanying drawings, wherein:

FIG. 1 shows a block diagram of a magnetic wave based wireless power transmission system.

DETAILED DESCRIPTION

In one embodiment, a wireless powering-charging system is disclosed, based on a transmitter that sends a substantially unmodulated signal or beacon (e.g., the carrier only). A receiver may be tuned to extract energy from the radiated field of the transmitter. The receiver powers an electronic device or charges a battery. A basic embodiment is shown in FIG. 1. A power transmitter assembly 100 receives power from a source, for example, an AC plug 102. A frequency generator 104 is used to couple the energy to an antenna 110, here a resonant antenna. The antenna 110 includes an inductive loop 111, which is inductively coupled to a high Q resonant antenna part 112. The resonant antenna includes a number N of coil loops 113 each loop having a radius $R_A$. A capacitor 114, here shown as a variable capacitor, is in series with the coil 113, forming a resonant loop. In the embodiment, the capacitor is a totally separate structure from the coil, but in certain embodiments, the self capacitance of the wire forming the coil can form the capacitance 114.

The frequency generator 104 can be preferably tuned to the antenna 110, and also selected for FCC compliance.

This embodiment uses a multidirectional antenna. 115 shows the energy as output in all directions. The antenna 100 is non-radiative, in the sense that much of the output of the antenna is not electromagnetic radiating energy, but is rather a magnetic field which is more stationary. Of course, part of the output from the antenna will in fact radiate.

Another embodiment may use a radiative antenna.

A receiver 150 includes a receiving antenna 155 placed a distance D away from the transmitting antenna 110. The receiving antenna is similarly a high Q resonant coil antenna 151 having a coil part and capacitor, coupled to an inductive coupling loop 152. The output of the coupling loop 152 is rectified in a rectifier 160, and applied to a load. That load can be any type of load, for example a resistive load such as a light bulb, or an electronic device load such as an electrical appliance, a computer, a rechargeable battery, a music player or an automobile.

One embodiment allows the power that has been transmitted to be stored in a storage part such as a battery. Because of this, power transmission can be stopped temporarily; while still allowing the powered device to operate.

The energy can be transferred through either electrical field coupling or magnetic field coupling, although magnetic field coupling is predominantly described herein as an embodiment.

Electrical field coupling provides an inductively loaded electrical dipole that is an open capacitor or dielectric disk. Extraneous objects may provide a relatively strong influence on electric field coupling. Magnetic field coupling may be preferred, since extraneous objects in a magnetic field have the same magnetic properties as "empty" space.

The embodiment describes a magnetic field coupling using a capacitively loaded magnetic dipole. Such a dipole is formed of a wire loop forming at least one loop or turn of a coil, in series with a capacitor that electrically loads the antenna into a resonant state.

There are two different kinds of limits placed on emissions of this type: limits based on biological effects, and limits based on regulatory effect. The latter effect simply are used to avoid interference with other transmissions.

The biological limits are based on thresholds, above which adverse health effects may occur. A safety margin is also added. The regulatory effects are set based on avoiding interference with other equipment, as well as with neighboring frequency bands.

The limits are usually set based on density limits e.g. watts per square centimeter; magnetic field limits, for example amps per meter, and electric field limits, such as volts per meter. The limits are related through the impedance of free space for far field measurements.

The FCC is the governing body for wireless communications in the USA. The applicable regulatory standard is FCC CFR Title 47. The FCC also specifies radiative emission limits for E-fields in §15.209. These limits are shown in Table I and the equivalent H-field limits are shown in Table 2.

TABLE I

| Frequency (MHz) | Field Strength (microvolts/meter) | Measurement Distance (meters) |
|---|---|---|
| 0.009-0.490 | 2400/F(kHz) | 300 |
| 0.490-1.705 | 24000/F(kHz) | 30 |
| 1.705-30.0 | 30 | 30 |
| 30-88 | 100** | 3 |
| 88-216 | 150** | 3 |
| 216-960 | 200** | 3 |
| Above 960 | 500 | 3 |

**Except as provided in paragraph (g), fundamental emissions from intentional radiators operating under this Section shall not be located in the frequency bands 54-72 MHz, 76-88 MHz, 174-216 MHz or 470-806 MHz. However, operation within these frequency bands is permitted under other sections of this Part, e.g., Sections 15.231 and 15.241.

There is an exception at the 13.56 MHz ISM band which states that between 13.553-13.567 MHz the E-field strength shall not exceed 15,848 microvolts/meter at 30 meters.

TABLE 2

| FCC Title 47 Part 15 H-filed radiated emission limits | | |
|---|---|---|
| Frequency (MHz) | H-Field Strength (μA/m) | Measurement Distance (m) |
| 0.009-0.490 | 6.366/f(kHz) | 300 |
| 0.490-1.705 | 63.66/f(kHz) | 30 |
| 1.705-30.0 | 0.0796 | 30 |
| 13.553-13.567 | 42.04 | 30 |

In order to compare the EN 300330 regulatory limits to the FCC regulatory limits, the FCC limits can be extrapolated to measurements made at 10 m. The FCC states in §15.31 that for frequencies below 30 MHz, an extrapolation factor of 40 dB/decade should be used. The table 3 shows the extrapolated values for the two frequencies of interest. These levels can be used for comparison purposes.

TABLE 3

| Frequency (MHz) | H-Field Strength (dBμA/m) @10 m |
|---|---|
| 0.130 | 32.8 |
| 13.56 | 51.6 |

European standards for EMF levels are regulated by ETSI and CENELEC.

The ETSI regulatory limits are published under *ETSI EN* 300 330-1 *V*1.5.1 (2006-4): *Electromagentic compatibility and Radio spectrum Matters* (*ERM*); *Short Range Devices* (*SRD*); *Radio equipment in the frequency range* 9 *kHz to* 25 *MHz and inductive loop systems in the frequency range* 9 *kHz to* 30 *MHz; Part* 1*: Technical characteristics and test methods*. EN 300 330 specifies H-field (radiated) limits which must be measured at 10 m. These limits are shown in table 4.

TABLE 4

| ETSI EN 300 330: H-field limits at 10 m | |
|---|---|
| Frequency range (MHz) | H-field strength limit ($H_f$) dBμA/m at 10 m |
| 0.009 ≤ f < 0.315 | 30 |
| 0.009 ≤ f < 0.03 | 72 or according to note 1 |
| 0.03 ≤ f < 0.05975 | 72 at 0.03 MHz descending 3 dB/oct |
| 0.06025 ≤ f < 0.07 | or according to note 1 |
| 0.119 ≤ f < 0.135 | |
| 0.05975 ≤ f < 0.06025 | 42 |
| 0.07 ≤ f < 0.119 | |
| 0.135 ≤ f < 0.140 | |
| 0.140 ≤ f < 0.1485 | 37.7 |

TABLE 4-continued

| ETSI EN 300 330: H-field limits at 10 m | |
|---|---|
| Frequency range (MHz) | H-field strength limit ($H_f$) dBμA/m at 10 m |
| 0.1485 ≤ f < 30 | −5 (see note 4) |
| 0.315 ≤ f < 0.600 | −5 |
| 3.155 ≤ f < 3.400 | 13.5 |
| 7.400 ≤ f < 8.800 | 9 |
| 10.2 ≤ f < 11.00 | 9 |
| 6.765 ≤ f ≤ 6.795 | 42 (see note 3) |
| 13.553 ≤ f ≤ 13.567 | |
| 26.957 ≤ f ≤ 27.283 | |
| 13.553 ≤ f ≤ 13.567 | 60 (see notes 2 and 3) |

note 1: For the frequency ranges 9 to 70 kHz and 119 to 135 kHz, the following additional restrictions apply to limits above 42 dBμA/m. for loop coil antennas with an area ≥0.16 $m^2$ table 4 applies directly; for loop coil antennas with an area between 0.05 $m^2$ and 0.16 $m^2$ table 4 applies with a correction factor. The limit is: table value + 10 × log (area/0.16 $m^2$); for loop coil antennas with an area <0.05 $m^2$ the limit is 10 dB below table 4.
note 2: For RFID and EAS applications only.
note 3: Spectrum mask limit, see annex G.
note 4: For further information see annex H.

TABLE 5

| Frequency range MHz | Total H-field strength at 10 m dBμA/m | H-field strength density at 10 m in a 10 kHz resolution bandwidth dBμA/m |
|---|---|---|
| 0.1485 to 30.0 | −5 (note 1) | −15 (note 2) |

note 1: Without transmitter modulation.
note 2: With transmitter modulation.

CENELEC publishes the following relevant documents to H-field levels, however these levels are in regards to human exposure (biological) limits:

EN 50366: "Household and similar electrical appliances—Electromagnetic fields—Methods for evaluation and measurement" (CLC TC 61, produced in a joint group with CLC TC 106X)

EN 50392: "Generic standard to demonstrate the compliance of electronic and electrical apparatus with the basic restrictions related to human exposure to electromagnetic fields (0 Hz-300 GHz)"

Both of these documents use the limits given by ICNIRP.

Health/Biological Limits are also set by the International Non-Ionizing Radiation Committee (INIRC).

The INIRC was established was established in 1992 as a successor to the International Radiation Protection Association (IRPA)/International Non-Ionizing Radiation Committee (INIRC). Their functions are to investigate the hazards which are associated with different forms of NIR, to develop international guidelines on NIR exposure limits and to deal with all aspects of NIR protection. The ICNIRP is a body of independent scientific experts consisting of a main Commission of 14 members, 4 Scientific Standing Committees and a number of consulting experts. They also work closely together with the WHO in developing human exposure limits.

They have produced a document establishing guidelines for limiting EMF exposure in order to provide protection against known adverse health effects. In this document, two different classes of guidelines are defined:

Basic restrictions: "restrictions on exposure to time-varying electric, magnetic and electromagnetic fields that are based directly on established health effects" quantities used for measurement: current density, specific energy absorption rate and power density.

Various scientific bases were determined for providing the basic restrictions based on a number of scientific studies, which have been performed. The scientific studies were used to determine a threshold at which the various adverse health effects could occur. The basic restrictions are then determined from these thresholds including varying safety factors. The following is a description of the scientific bases that were used in determining the basic restrictions for different frequency ranges:

1 Hz-10 MHz: restrictions based on current density to prevent effects on nervous system function 100 kHz-10 MHz: restrictions based on SAR to prevent whole-body heat stress and excessive localized tissue heating as well as current density to prevent effects on nervous system function 10 MHz-10 GHz: restrictions based solely on SAR to prevent whole-body heat stress and excessive localized tissue heating 10 GHz-300 GHz: restrictions based on power density to prevent excessive heating in tissue at or near the body surface The basic restrictions are based on acute, instantaneous effects in the central nervous system and therefore the restrictions apply to both short term or long term exposure.

Reference levels: "provided for practical exposure assessment purposes to determine whether the basic restrictions are likely to be exceeded" quantities used for measurement: electric field strength, magnetic field strength, magnetic flux density, power density and currents flowing through the limbs.

The reference levels are obtained from the basic restrictions by mathematical modeling and extrapolation from the results of laboratory investigations at specific frequencies.

Magnetic field models (for determining reference levels) assume that the body has a homogeneous and isotropic conductivity and apply simple circular conductive loop models to estimate induced currents in different organs and body regions by using the following equation for a pure sinusoidal field at frequency f derived from Faraday's law of induction:

$$J=\pi Rf\sigma B$$

B: magnetic flux density

R: radius of the loop for induction of the current

For frequencies above 10 MHz, the derived E and H field strengths were obtained from the whole-body SAR basic restrictions using computational and experimental data. The SAR values are might not be valid for the near field. For a conservative approximation, these field exposure levels can be used for the near field since the coupling of energy from the E or H field contribution cannot exceed the SAR restrictions. For a less conservative estimate, the basic restrictions should be used.

In order to comply with the basic restrictions, the reference levels for E and H fields may be considered separately and not additively.

These restrictions describe three different coupling mechanisms through which time-varying fields interact with living matter:

coupling to low-frequency electric fields: results in reorientation of the electric dipoles present in the tissue coupling to low-frequency magnetic fields: results in induced electric fields and circulating electric currents absorption of energy from electromagnetic fields: results in energy absorption and temperature increases which can be divided into four categories:

100 Hz-20 MHz: energy absorption is most significant in the neck and legs

20 MHz-300 MHz: high absorption in the whole body

300 MHz-10 GHz: significant local non-uniform absorption

>10 GHz: absorption occurs mainly at the body surface.

The INIRC has divided up their guidelines into two different frequency ranges and a summary of the biological effects for each frequency range is shown below:

Up to 100 kHz:

Exposure to low frequency fields are associated with membrane stimulation and related effects on the central nervous system leading to nerve and muscle stimulation Laboratory studies have shown that there is no established adverse health effects when induced current density is at or below 10 mA m^−2.

100 kHz-300 GHz:

Between 100 kHz and 10 MHz, a transition region occurs from membrane effects to heating effects from electromagnetic energy absorption.

Above 10 MHz the heating effects are dominant

Temperature rises of more than 1-2° C. can have adverse health effects such as heat exhaustion and heat stroke.

A 1° C. body temperature increase can result from approximately 30 minutes exposure to an EMF producing a whole-body SAR of 4 W/kg.

An occupational exposure restriction of 0.4 W/kg (10% of the maximum exposure limit of 4 W/kg).

Pulsed (modulated) radiation tends to produce a higher adverse biological response compared to CW radiation. An example of this is the "microwave hearing" phenomenon where people with normal hearing can perceive pulse-modulated fields with frequencies between 200 MHz-6.5 GHz.

Basic restrictions and reference levels have been provided for two different categories of exposure:

General public exposure: exposure for the general population whose age and health status may differ from those of workers. Also, the public is, in general, not aware of their exposure to fields and cannot take any precautionary actions (more restrictive levels).

Occupational exposure: exposure to known fields allowing precautionary measures to be taken if required (less restrictive levels)

TABLE 2-4

ICNIRP Basic Restrictions (up to 10 GHz)

Table 4. Basic restrictions for time varying electric and magnetic fields for frequencies up to 10 GHz.[a]

| Exposure characteristics | Frequency range | Current density for head and trunk ($mA\ m^{-2}$) (rms) | Whole-body average SAR ($W\ kg^{-1}$) | Localized SAR (head and trunk) ($W\ kg^{-1}$) | Localized SAR (limbs) ($W\ kg^{-1}$) |
|---|---|---|---|---|---|
| Occupational exposure | up to 1 Hz | 40 | — | — | — |
| | 1-4 Hz | 40/f | — | — | — |
| | 4 Hz-1 kHz | 10 | — | — | — |
| | 1-100 kHz | f/100 | — | — | — |
| | 100 kHz-10 MHz | f/100 | 0.4 | 10 | 20 |
| | 10 MHz-10 GHz | — | 0.4 | 10 | 20 |

TABLE 2-4-continued

ICNIRP Basic Restrictions (up to 10 GHz)
Table 4. Basic restrictions for time varying electric and magnetic fields for frequencies up to 10 GHz.[a]

| Exposure characteristics | Frequency range | Current density for head and trunk (mA $m^{-2}$) (rms) | Whole-body average SAR (W $kg^{-1}$) | Localized SAR (head and trunk) (W $kg^{-1}$) | Localized SAR (limbs) (W $kg^{-1}$) |
|---|---|---|---|---|---|
| General public exposure | up to 1 Hz | 8 | — | — | — |
| | 1-4 Hz | 8/f | — | — | — |
| | 4 Hz-1 kHz | 2 | — | — | — |
| | 1-100 kHz | f/500 | — | — | — |
| | 100 kHz-10 MHz | f/500 | 0.08 | 2 | 4 |
| | 10 MHz-10 GHz | — | 0.08 | 2 | 4 |

[a]Note:
1. f is the frequency in hertz.
2. Because of electrical inhomogeneity of the body, current densities should be averaged over a cross-section of 1 $cm^2$ perpendicular to the current direction.
3. For frequencies up to 100 kHz, peak current density values can be obtained by multiplying the rms value by √2 (~1.414). For pulses of duration $t_p$ the equivalent frequency to apply in the basic restrictions should be calculated as $f = 1/(2t_p)$.
4. For frequencies up to 100 kHz and for pulsed magnetic fields, the maximum current density associated with the pulses can be calculated from the rise/fall times and the maximum rate of change of magnetic flux density. The induced current density can then be compared with the appropriate basic restriction.
5. All SAR values are to be averaged over any 6-min period.
6. Localized SAR averaging mass is any 10 g of contiguous tissue, the maximum SAR so obtained should be the value used for the estimation of exposure.
7. For pulses of duration $t_p$ the equivalent frequency to apply in the basic restrictions should be calculated as $f = 1/(2t_p)$. Additionally, for pulsed exposures in the frequency range 0.3 to 10 GHz and for localized exposure of the head in order to limit or avoid auditory effects caused by thermoelastic expansion, an additional basic restriction is recommended. This is that the SA should not exceed 10 mJ $kg^{-1}$ for workers and 2 mJ $kg^{-1}$ for the general public, averaged over 10 g tissue.

TABLE 2-5

ICNIRP Basic Restrictions (10-300 GHz)
Table 5. Basic restrictions for power density for frequencies between 10 and 300 GHz.[a]

| Exposure characteristics | Power density (W $m^{-2}$) |
|---|---|
| Occupational exposure | 50 |
| General public | 10 |

[a]Note:
1. Power densities are to be averaged over any 20 $cm^2$ of exposed area and any $68/f^{1.05}$ -min period (where f is in GHz) to compensate for progressively shorter penetration depth as the frequency increases.
2. Spatial maximum power densities, averaged over 1 $cm^2$, should not exceed 20 times the values above.

TABLE 2-6

ICNIRP Reference Levels - Occupational Exposure
Table 6. Reference levels for occupational exposure to time-varying electric and magnetic fields (unperturbed rms values).[a]

| Frequency range | E-field strength (V $m^{-1}$) | H-field strength (A $m^{-1}$) | B-field (μT) | Equivalent plane wave power density $S_{eq}$ (W $m^{-2}$) |
|---|---|---|---|---|
| up to 1 Hz | — | $1.63 \times 10^5$ | $2 \times 10^5$ | — |
| 1-8 Hz | 20,000 | $1.63 \times 10^5/f^2$ | $2 \times 10^5/f^2$ | — |
| 8-25 Hz | 20,000 | $2 \times 10^4/f$ | $2.5 \times 10^4/f$ | — |
| 0.025-0.82 kHz | 500/f | 20/f | 25/f | — |
| 0.82-65 kHz | 610 | 24.4 | 30.7 | — |
| 0.065-1 MHz | 610 | 1.6/f | 2.0/f | — |
| 1-10 MHz | 610/f | 1.6/f | 2.0/f | — |
| 10-400 MHz | 61 | 0.16 | 0.2 | 10 |
| 400-2,000 MHz | $3f^{1/2}$ | $0.008f^{1/2}$ | $0.01f^{1/2}$ | f/40 |
| 2-300 GHz | 137 | 0.36 | 0.45 | 50 |

[a]Note:
[1]f as indicated in the frequency range column.
[2]Provided that basic restrictions are met and adverse indirect effects can be excluded, field strength values can be exceeded.
[3]For frequencies between 100 kHz and 10 GHz, $S_{eq}$, $E^2$, $H^2$, and $B^2$ are to be averaged over any 6-min period.
[4]For peak values at frequencies up to 100 kHz see Table 4, note 3.
[5]For peak values at frequencies exceeding 100 kHz see FIGS. 1 and 2. Between 100 kHz and 10 MHz, peak values for the field strengths are obtained by interpolation from the 1.5-fold peak at 100 kHz to the 32-fold peak at 10 MHz For frequencies exceeding 10 MHz it is suggested that the peak equivalent plane wave power density, as averaged over the pulse width, does not exceed 1,000 times the $S_{eq}$ restrictions, or that the field strength does not exceed 32 times the field strength exposure levels given in the table.
[6]For frequencies exceeding 10 GHz, $S_{eq}$, $E^2$, $H^2$, and $B^2$ are to be averaged over any $68/f^{1.05}$-min period (f in GHz)
[7]No E-field value is provided for frequencies <1 Hz, which are effectively static electric fields. Electric shock from low impedance sources is prevented by established electrical safety procedures for such equipment.

TABLE 2-7

ICNIRP Reference Levels - General Public Exposure
Table 7. Reference levels for general public exposure to time-varying electric and magnetic fields (unperturbed rms values).[a]

| Frequency range | E-field strength (V $m^{-1}$) | H-field strength (A $m^{-1}$) | B-field (μT) | Equivalent plane wave power density $S_{eq}$ (W $m^{-2}$) |
|---|---|---|---|---|
| up to 1 Hz | — | $3.2 \times 10^4$ | $4 \times 10^4$ | — |
| 1-8 Hz | 10,000 | $3.2 \times 10^4/f^2$ | $4 \times 10^4/f^2$ | — |
| 8-25 Hz | 10,000 | 4,000/f | 5,000/f | — |
| 0.025-0.8 kHz | 250/f | 4/f | 5/f | — |
| 0.8-3 kHz | 250/f | 5 | 6.25 | — |
| 3-150 kHz | 87 | 5 | 6.25 | — |
| 0.15-1 MHz | 87 | 0.73/f | 0.92/f | — |
| 1-10 MHz | $87/f^{1/2}$ | 0.73/f | 0.92/f | — |
| 10-400 MHz | 28 | 0.073 | 0.092 | 2 |
| 400-2,000 MHz | $1.375f^{1/2}$ | $0.0037f^{1/2}$ | $0.0046f^{1/2}$ | f/200 |
| 2-300 GHz | 61 | 0.16 | 0.20 | 10 |

[a]Note:

[1]f as indicated in the frequency range column.

[2]Provided that basic restrictions are met and adverse indirect effects can be excluded, field strength values can be exceeded.

[3]For frequencies between 100 kHz and 10 GHz, $S_{eq}$, $E^2$, $H^2$, and $B^2$ are to be averaged over any 6-min period.

[4]For peak values at frequencies up to 100 kHz see Table 4, note 3.

[5]For peak values at frequencies exceeding 100 kHz see FIGS. 1 and 2. Between 100 kHz and 10 MHz, peak values for the field strengths are obtained by interpolation from the 1.5-fold peak at 100 kHz to the 32-fold peak at 10 MHz For frequencies exceeding 10 MHz it is suggested that the peak equivalent plane wave power density, as averaged over the pulse width, does not exceed 1,000 times the $S_{eq}$ restrictions, or that the field strength does not exceed 32 times the field strength exposure levels given in the table.

[6]For frequencies exceeding 10 GHz, $S_{eq}$, $E^2$, $H^2$, and $B^2$ are to be averaged over any $68/f^{1.05}$-min period (f in GHz)

[7]No E-field value is provided for frequencies <1 Hz, which are effectively static electric fields, perception of surface electric charges will not occur at field strengths less than 25 $kVm^{-1}$. Spark discharges causing stress or annoyance should be avoided.

In addition to regulatory limits, the FCC also specifies maximum exposure levels based on adverse health effects in CFR Title 47. These health limits are specified based on different categories of devices which are specified in Part 2 of Title 47 (§2.1091 and §2.1093):

mobile devices: A mobile device is defined as a transmitting device designed to be used in such that the separation distance of at least 20 cm is normally maintained between the transmitter's radiating structure(s) and the body of the user or nearby persons.

portable devices: A portable device is defined as a transmitting device designed to be used so that the radiating structure(s) of the device is/are within 20 centimeters of the body of the user.

general/fixed transmitters: non-portable or mobile devices In §2.1093, it is specified that for modular or desktop transmitters, the potential conditions of use of a device may not allow easy classification of that device as either mobile or portable. In such cases, applicants are responsible for determining minimum distances for compliance for the intended use and installation of the device based on evaluation of either SAR, field strength or power density, whichever is most appropriate.

The exposure limits are the same for mobile devices and general/fixed transmitters are given in §1.1310 and are shown in Table 2-8. The only difference is that the time-averaging procedures may not be used in determining field strength for mobile devices. This means that the averaging time in the table below does not apply to mobile devices.

TABLE 2-8

FCC Exposure Limits
LIMITS FOR MAXIMUM PERMISSIBLE EXPOSURE (MPE)

| Frequency range (MHz) | Electric field strength (V/m) | Magnetic field strength (A/m) | Power density (mW/$cm^2$) | Averaging time (minutes) |
|---|---|---|---|---|
| (A) Limits for Occupational/Controlled Exposures | | | | |
| 0.3-3.0 | 614 | 1.63 | *(100) | 6 |
| 3.0-30 | 1842/f | 4.89/f | *($900/f^2$) | 6 |
| 30-300 | 61.4 | 0.163 | 1.0 | 6 |
| 300-1500 | | | f/300 | 6 |
| 1500-100,000 | | | 5 | 6 |
| (B) Limits for General Population/Uncontrolled Exposure | | | | |
| 0.3-1.34 | 614 | 1.63 | *(100) | 30 |
| 1.34-30 | 824/f | 2.19/f | *($180/f^2$) | 30 |
| 30-300 | 27.5 | 0.073 | 0.2 | 30 |
| 300-1500 | | | f/1500 | 30 |
| 1500-100,000 | | | 1.0 | 30 |

f = frequency in MHz

*= Plane-wave equivalent power density

NOTE 1 TO TABLE 1: Occupational/controlled limits apply in situations in which persons are exposed as a consequence of their employment provided those persons are fully aware of the potential for exposure and can exercise control over their exposure. Limits for occupational/controlled exposure also apply in situations when an individual is transient through a location where occupational/controlled limits apply provided he or she is made aware of the potential for exposure.

NOTE 2 TO TABLE 1: General population/uncontrolled exposures apply in situations in which the general public may be exposed, or in which persons that are exposed as a consequence of their employment may not be fully aware of the potential for exposure or can not exercise control over their exposure.

The exposure levels for portable devices operating between 100 kHz and 6 GHz are shown below:

| | |
|---|---|
| Occupational/Controlled exposure: apply when persons are exposed as a consequence of their employment provided they are aware of the exposure | SAR: 0.4 W/kg as averaged over the whole body and spatial peak SAR not exceeding 8 W/kg as averaged over any 1 g of tissue |

-continued

| | |
|---|---|
| General population/Uncontrolled exposure: apply when the general public is exposed | SAR: 0.08 W/kg as averaged over the whole body and spatial peak SAR not exceeding 1.6 W/kg as averaged over any 1 g of tissue |

World Health Organization (WHO)

The WHO has produced a model legislation protecting their citizens from high levels of exposure to EMFs which could produce adverse health effects. This act is known as The Electromagnetic Fields Human Exposure Act.

IEEE Std C95.1-2005

The IEEE Std C95.1-2005 is the standard for safety levels with respect to human exposure to radio frequency electromagnetic fields, 3 kHz-300 GHz. It is an ANSI approved and recognized standard. The standard divides the adverse effects into three different frequency ranges:

3 kHz-100 kHz: Effects associated with electrostimulation 100 kHz-5 MHz: Transition region with effects associated with electrostimulation and heating effects 5 MHz-300 GHz: Heating effects The recommendations are divided into two different categories:

Basic Restrictions (BRs): limits on internal fields, SAR and current density

For frequencies between 3 kHz and 5 MHz the BRs refer to limits on the electric fields within the biological tissue that minimize the adverse effects due to electrostimulation For frequencies between 100 kHz and 3 GHz, the BRs are based on established health effects associated with heating of the body during whole-body exposure. A traditional safety factor of 10 has been applied to upper tier exposure and 50 for lower tier exposure.

Maximum Permissible Exposure (MPE) values: limits on external fields and induced and contact current For frequencies between 3 kHz and 5 MHz, the MPE corresponds to minimizing the adverse effects due to electrostimulation of biological tissue For frequencies between 100 kHz and 3 GHz, the MPE corresponds to the spatially average plane wave equivalent power density or the spatially averaged values of the squares of electric and magnetic field strengths For frequencies below 30 MHz, in order to be compliant, both the E and H field levels must be within the provided limits Two different tiers of exposure limits have been established:

upper tier: (exposure of persons in controlled environments) This tier represents the upper level exposure limit below which there is no scientific evidence supporting a measurable risk lower tier: (general public) This tier includes an additional safety factor which recognizes public concern about exposure as well as support harmonization with NCRP recommendations and ICNIRP guidelines. This tier addresses the concern of continuous, long-term exposure of all individuals.

TABLE 2-9

BRs for frequencies between 3 kHz and 5 MHz

| Exposed tissue | $f_e$ (Hz) | Action level[a] $E_s$ (rms) (V/m) | Persons in controlled environments $E_0$ (rms) (V/m) |
|---|---|---|---|
| Brain | 20 | $5.89 \times 10^{-3}$ | $1.77 \times 10^{-2}$ |
| Heart | 167 | 0.943 | 0.943 |
| Extremities | 3350 | 2.10 | 2.10 |
| Other tissues | 3350 | 0.701 | 2.10 |

[a]Within this frequency range the term "action level" is equivalent to the term "general public" in IEEE Std C95.6-2002.

TABLE 2-10

BRs for frequencies between 100 kHz and 3 GHz

| | | Action level[a] SAR[b] (W/kg) | Persons in controlled environments SAR[c] (W/kg) |
|---|---|---|---|
| Whole-body exposure | Whole-Body Average (WBA) | 0.08 | 0.4 |
| Localized exposure | Localized (peak spatial-average) | 2[c] | 10[c] |
| Localized Exposure | extremities[d] and pinnae | 4[c] | 20[c] |

[a]BR for the general public when an RF safety program is unavailable.
[b]SAR is averaged over the appropriate averaging times as shown in Table 8 and Table 9.
[c]Averaged over any 10 g of tissue (defined as a tissue volume in the shape of a cube).*
[d]The extremities are the arms and legs distal from the elbows and knees, respectively.
*The volume of the cube is approximately 10 $cm^3$.

TABLE 2-11

MPE for exposure to head and torso for frequencies between 3 kHz and 5 MHz

| Frequency | Action level[a] | | Persons in controlled environments | |
|---|---|---|---|---|
| range (kHz) | $B_{rms}$ (mT) | $H_{rms}$ (A/m) | $B_{rms}$ (mT) | $H_{rms}$ (A/m) |
| 3.0-3.35 | 0.687/f | 547/f | 2.06/f | 1640/f |
| 3.35-5000 | 0.205 | 163 | 0.615 | 490 |

NOTE
f is expressed in kHz.
[a]Within this frequency range the term "action level" is equivalent to the term "general public" in IEEE Std C95.6-2002.

TABLE 2-12

MPE for exposure to limbs for frequencies between 3 kHz and 5 MHz

| Frequency | Action level[a] | | Persons in controlled environments | |
|---|---|---|---|---|
| range (kHz) | $B_{rms}$ (mT) | $H_{rms}$ (A/m) | $B_{rms}$ (mT) | $H_{rms}$ (A/m) |
| 3.0-3.35 | 3.79/f | 3016/f | 3.79/f | 3016/f |
| 3.35-5000 | 1.13 | 900 | 1.13 | 900 |

NOTE
f is expressed in kHz.
[a]Within this frequency range the term "action level" is equivalent to the term "general public" in IEEE Std C95.6-2002.

TABLE 2-13

| MPE for the upper tier for frequencies between 100 kHz and 300 GHz | | | | |
|---|---|---|---|---|
| Frequency range (MHz) | RMS electric field strength (E)[a] (V/m) | RMS magnetic field strength (H)[a] (A/m) | RMS power density (S) E-field, H-field (W/m$^2$) | Averaging time $\|E\|^2$, $\|H\|^2$ or S (min) |
| 0.1-1.0 | 1842 | $16.3/f_M$ | $(9000, 100\,000/f_M^2)^b$ | 6 |
| 1.0-30 | $1842/f_M$ | $16.3/f_M$ | $(9000/f_M^2, 100\,000/f_M^2)$ | 6 |
| 30-100 | 61.4 | $16.3/f_M$ | $(10, 100\,000/f_M^2)$ | 6 |
| 100-300 | 61.4 | 0.163 | 10 | 6 |
| 300-3000 | — | — | $f_M/30$ | 6 |
| 3000-30 000 | — | — | 100 | $19.63/f_G^{1.079}$ |
| 30 000-300 000 | — | — | 100 | $2.524/f_G^{0.476}$ |

NOTE
$f_M$ is the frequency in MHz,
$f_G$ is the frequency in GHz.
[a]For exposures that are uniform over the dimensions of the body, such as certain far-field plane-wave exposures, the exposure field strengths and power densities are compared with the MPEs in the Table. For non-uniform exposures, the mean values of the exposure fields, as obtained by spatially averaging the squares of the field strengths or averaging the power densities over an area equivalent to the vertical cross section of the human body (projected area), or a smaller area depending on the frequency (see NOTES to Table 8 and Table 9 below), are compared with the MPEs in the Table.
[b]These plane-wave equivalent power density values are commonly used as a convenient comparison with MPEs at higher frequencies and are displayed on some instruments in use.

TABLE 2-14

| MPE for the lower tier for frequencies between 100 kHz and 300 GHz | | | | | |
|---|---|---|---|---|---|
| Frequency range (MHz) | RMS electric field strength (E)[a] (V/m) | RMS magnetic field strength (H)[a] (A/m) | RMS power density (S) E-field, H-field (W/m$^2$) | Averaging time[b] $\|E\|^2$, $\|H\|^2$ or S (min) | |
| 0.1-1.34 | 614 | $16.3/f_M$ | $(1000, 100\,000/f_M^2)^c$ | 6 | 6 |
| 1.34-3 | $823.8/f_M$ | $16.3/f_M$ | $(1800/f_M^2, 100\,000/f_M^2)$ | $f_M^2/0.3$ | 6 |
| 3-30 | $823.8/f_M$ | $16.3/f_M$ | $(1800/f_M^2, 100\,000/f_M^2)$ | 30 | 6 |
| 30-100 | 27.5 | $158.3/f_M^{1.658}$ | $(2, 9\,400\,000/f_M^{3.336})$ | 30 | $0.0636f_M^{1.337}$ |
| 100-400 | 27.5 | 0.0729 | 2 | 30 | 30 |
| 400-2000 | — | — | $f_M/200$ | 30 | |
| 2000-5000 | — | — | 10 | 30 | |
| 5000-30 000 | — | — | 10 | $150/f_G$ | |
| 30 000-100 000 | — | — | 10 | $25.24/f_G^{0.476}$ | |
| 100 000-300 000 | — | — | $(90f_G - 7000)/200$ | $5048/[(9f_G - 700)f_G^{0.476}]$ | |

NOTE
$f_M$ is the frequency in MHz. $f_G$ is the frequency in GHz.
[a]For exposures that are uniform over the dimensions of the body, such as certain far-field plane-wave exposures, the exposure field strengths and power densities are compared with the MPEs in the Table. For non-uniform exposures, the mean values of the exposure fields, as obtained by spatially averaging the squares of the field strengths or averaging the power densities over an area equivalent to the vertical cross section of the human body (projected area) or a smaller area depending on the frequency (see NOTES to Table 8 and Table 9 below), are compared with the MPEs in the Table.
[b]The left column is the averaging time for $|E|^2$, the right column is the averaging time for $|H|^2$. For frequencies greater than 400 MHz, the averaging time is for power density S
[c]These plane-wave equivalent power density values are commonly used as a convenient comparison with MPEs at higher frequencies and are displayed on some instruments in use.

In certain frequencies of interest (f<30 MHz), there is no difference in the MPE limits for magnetic field strength between the upper and lower tiers.

For determining the MPE in the transition region (between 100 kHz and 5 MHz) both the MPE for frequencies between 3 kHz and 5 MHz and the MPE for frequencies between 100 kHz and 300 GHz should be considered. The more restrictive value between those MPEs should be chosen. This is because the two different values of MPEs relate to the MPE for electrostatic effects and the MPE for heating effects.

MPE values can be exceeded as long as BR values are not exceeded.

The view of this standard is that fields can exist which are actually above the limits specified (for example close to the transmitting loop) as long as an individual cannot be exposed to these fields. Hence, at least one embodiment may create fields that are higher than an allowable amount, but only in areas where a user cannot be located.

NATO has published a permissible exposure level document published under STANAG 2345. These levels are applicable for all NATO personnel who could be exposed to high RF levels. The basic exposure levels are the typical 0.4 W/kg. The NATO permissible exposure levels appear to be based on the IEEE C95.1 standard and are shown in Table 2-15.

TABLE 2-15

| NATO permissible exposure levels | | | | |
|---|---|---|---|---|
| Frequency Range (*) (MHz) | Electric Field (E) (V/m) | Magnetic Field (H) (A/m) | Power Density (S)† E field, H field (W/m$^2$) | Averaging Time ($T_{avg}$ in min.) (E.H.S) |
| 0.003-0.1 | 614 | 163 | $(10^3, 10^7)$** | 6 |
| 0.1-3.0 | 614 | 16.3/f | $(10^3, 10^5/f^2$** | 6 |

TABLE 2-15-continued

NATO permissible exposure levels

| Frequency Range (*) (MHz) | Electric Field (E) (V/m) | Magnetic Field (H) (A/m) | Power Density (S)† E field, H field (W/m²) | Averaging Time ($T_{avg}$ in min.) (E.H.S) |
|---|---|---|---|---|
| 3-30 | 1842/f | 16.3/f | $(9000/f^2, 10^5/f^2)$** | 6 |
| 30-100 | 61.4 | 16.3/f | $(10, 10^5/f^2)$** | 6 |
| 100-300 | 61.4 | 0.163 | 10** | 6 |
| 300-3000 | | | f/30 | 6 |
| 3000-15000 | | | 100 | 6 |
| 15000-300000 | | | 100 | $616000/f^{1.2}$ |

Ministry of Internal Affairs and Communications (MIC), Japan has also set certain limits.

The RF protection guidelines in Japan are set by the MIC. The limits set by the MIC are shown in Table. The Japanese exposure limits are slightly higher than the ICNIRP levels, but less than the IEEE levels.

TABLE 2-16

Japanese MIC RF exposure limits (f is in MHz)

| Exposure Category | Frequency | E-Field Strength (kV/m) | H-Field Strength (A/m) |
|---|---|---|---|
| Occupational | 10 kHz-30 kHz | 0.614 | 163 |
| | 30 kHz-3 MHz | 0.614 | 4.9/f |
| | 3 MHz-30 MHz | 1.842/f | 4.9/f |
| General public | 10 kHz-30 kHz | 0.275 | 72.8 |
| | 30 kHz-3 MHz | 0.275 | 2.18/f |
| | 3 MHz-30 MHz | 0.824/f | 2.18/f |

Health Canada's Radiation Protection Bureau has established safety guidelines for exposure to radiofrequency fields. The limits can be found in Safety Code 6*: Limits of Exposure to Radiofrequency Fields at Frequencies from* 10 *kHz*-300 *GHz*. The exposure limits are based on two different types of exposure:

Occupational: for individuals working on sources of radiofrequency fields (8 hours per day, 5 days per week)

Safety factor of one-tenth of the lowest level of exposure that could cause harm.

General public: for individuals who could be exposed 24 hours per day, 7 days per week.

Safety factor of one-fiftieth of the lowest level of exposure that could cause harm.

The limits are divided into two different categories:

Basic Restrictions Apply to distances of less than 0.2 m from the source or at frequencies between 100 kHz-10 GHz.

TABLE 2-17

Safety Code 6 Basic Restrictions - Occupational

| Condition | SAR Limit (W/kg) |
|---|---|
| The SAR averaged over the whole body mass | 0.4 |
| The local SAR for head, neck and trunk, averaged over any one gram (g) of tissue | 8 |
| The SAR in the limbs, as averaged over 10 g of tissue | 20 |

TABLE 2-18

Safety Code 6 Basic Restrictions - General public

| Condition | SAR Limit (W/kg) |
|---|---|
| The SAR averaged over the whole body mass | 0.08 |
| The local SAR for head, neck and trunk, averaged over any one gram (g) of tissue | 1.6 |
| The SAR in the limbs, as averaged over 10 g of tissue | 4 |

TABLE 2-19

Safety Code 6 Exposure Limits - Occupational

| 1 Frequency (MHz) | 2 Electric Field Strength: rms (V/m) | 3 Magnetic Field Strength: rms (A/m) | 4 Power Density (W/m²) | 5 Averaging Time (min) |
|---|---|---|---|---|
| 0.003-1 | 600 | 4.9 | | 6 |
| 1-10 | 600/f | 4.9/f | | 6 |
| 10-30 | 60 | 4.9/f | | 6 |
| 30-300 | 60 | 0.163 | 10* | 6 |
| 300-1 500 | $3.54f^{0.5}$ | $0.0094f^{0.5}$ | f/30 | 6 |
| 1 500-15 000 | 137 | 0.364 | 60 | 6 |
| 15 000-150 000 | 137 | 0.364 | 60 | $616\,000/f^{1.2}$ |
| 150 000-300 000 | $0.354f^{0.5}$ | $9.4 \times 10^{-4}f^{0.5}$ | $3.33 \times 10^{-4}f$ | $616\,000/f^{1.2}$ |

*Power density limit is applicable at frequencies greater than 100 MHz.

Notes:

1. Frequency, f, is in MHz.

2. A power density of 10 $W/m^2$ in equivalent to 1 $mW/cm^2$.

3. A magnetic field strength of 1 A/m corresponds to 1.257 microtexla (μT) or 12.57 milligram (mG).

TABLE 2-20

Safety Code 6 Exposure Limits - General Public

| 1 Frequency (MHz) | 2 Electric Field Strength: rms (V/m) | 3 Magnetic Field Strength: rms (A/m) | 4 Power Density ($W/m^2$) | 5 Averaging Time (min) |
|---|---|---|---|---|
| 0.003-1 | 280 | 2.19 | | 6 |
| 1-10 | 280/f | 2.19/f | | 6 |
| 10-30 | 28 | 2.19/f | | 6 |
| 30-300 | 28 | 0.073 | 2* | 6 |
| 300-1 500 | $1.565f^{0.5}$ | $0.0042f^{0.5}$ | f/150 | 6 |
| 1 500-15 000 | 61.4 | 0.163 | 10 | 6 |
| 15 000-150 000 | 61.4 | 0.163 | 10 | $616\,000/f^{1.2}$ |
| 150 000-300 000 | $0.158f^{0.5}$ | $4.21 \times 10^{-4}f^{0.5}$ | $6.67 \times 10^{-5}f$ | $616\,000/f^{1.2}$ |

*Power density limit is applicable at frequencies greater than 100 MHz.

Notes:

1. Frequency, f, is in MHz.

2. A power density of 10 $W/m^2$ in equivalent to 1 $mW/cm^2$.

3. A magnetic field strength of 1 A/m corresponds to 1.257 microtexla (μT) or 12.57 milligram (mG).

As evident from the above, different regulatory bodies define different limits. One reason is that there is a lack of knowledge about health effects and disagreement among experts.

The inventors recognize that a practical device should comply with all the different agency requirements, to avoid selling a unit that could be illegal, for example, when taken on vacation by a user. The USA has FCC regulations. Europe uses ETSI and CENELAC. Others have been described above.

The inventors recognize that in order to effectively make a unit, it must be usable in a number of different countries. For example, if a unit were made that were not usable in a certain country, for example, that unit could not be ever taken on vacation, or the like. This would be wholly impractical. Accordingly, according to an embodiment, antennas and practical devices are made which correspond with all these requirements.

One embodiment may user a system that allows operation in main countries, e.g., US and Europe by keeping below the levels for both countries. Another embodiment may vary the amount of delivered power based on a location, e.g., by an entered country code or by coding an electrical tip that is placed on the unit, for example, automatically adopting US safety standards when a US electrical tip is used.

Exposure limits for non-ionizing radiation may be set as defined by several organizations including the FCC, IEEE and ICNIRP. A limit may be set for limits from specified countries and not from others.

For vicinity power transmission to small portable devices present frequency regulations for ‘short range devices’ may allow power transfer up to a few hundreds of mW over distances <0.5 m.

Long range power transfer of a few hundreds of mW over distances <3 m may require higher field strength levels than specified by present frequency regulations. However it may be possible to meet exposure limits.

The band at 13.56 MHz +/−7 kHz (ISM-band) and frequencies below 135 kHz (LF and VLF) are potentially suitable for transmission of wireless power, since these bands have good values.

The permissible field strength levels at 135 kHz however are comparatively low, taking into account the fact that 20 dB higher H-field strength would be required at LF to transmit the same amount of power than at 13.56 MHz The term “power” as used herein can refer to any kind of energy, power or force transfer of any type. The receiving source can be any device that operates from stored energy, including a computer or peripheral, communicator, automobile, or any other device. Myriad applications of the foregoing transmitter, receiver and transceiver apparatus of the invention are recognized. By way of example and without limitation, such applications include: (i) powering or charging portable computers. PMDs, client devices, cellular phones, etc.; (ii) powering or charging flat screen or wall-mounted televisions or displays; (iii) powering or charging refrigerators (e.g., by placing a transmitter on the wall behind the refrigerator and a receiver in the refrigerator proximate to the transmitter); (iv) powering or charging electric cars; e.g., by placing or building in a transmitter in the floor of a garage, and placing a receiver on the bottom of the car; (v) powering or charging home or office lighting (e.g. incandescent, fluorescent or LED-based lamps with no cords); (vi) powering or charging home or office appliances such as toasters, blenders, clocks, televisions, microwave ovens, printers, computers, etc.; (vii) powering or charging multiple devices simultaneously (e.g., through the use of a substantially omni-directional transmitter arrangement); and (viii) powering or charging devices where the presence of electrical conductors with voltage would represent a hazard (e.g., near water, near children, etc).

The foregoing functions may be implemented at an electrical or electronic component level (e.g., via simple gate logic or the like implemented as anything from discrete components through highly integrated circuits, as computer programs or applications running on e.g., a micro-controller or digital processor, via firmware disposed on a IC, manually, or in hardware to the degree applicable (e.g., electromechanical tuners, motors, etc.).

Although only a few embodiments have been disclosed in detail above, other embodiments are possible and the inventors intend these to be encompassed within this specification. The specification describes specific examples to accomplish~more general goal that may be accomplished in another way. This disclosure is intended to be exemplary, and the claims are intended to cover any modification or alternative which might be predictable to a person having ordinary skill in the art. For example, other sizes, materials and connections can be used. Other embodiments may use similar principles of the embodiments and are equally applicable to primarily electrostatic and/or electrodynamic field coupling as well. In general, an electric field can be used in place of the magnetic field, as the primary coupling mechanism. Also, other values and other standards can be considered in forming the right values for transmission and reception.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method in a wireless power transfer system, comprising:

receiving power from a power source;

providing a substantially unmodulated signal to a transmitter antenna;

generating, with the transmitter antenna, a substantially non-radiative electromagnetic field;

determining a geographic location of the transmitter antenna;

adjusting the electromagnetic field to have a field strength that complies with a standard safety level of the determined geographic location; and transferring power via the substantially unmodulated signal and the substantially non-radiative electromagnetic field to a rechargeable battery of a wireless power receiver the transferred power being at a level sufficient for charging the rechargeable battery, the electromagnetic field having a first field strength that is compliant with a first power standard when the determined geographic location of the transmitter antenna corresponds to a first geographic location and having a second field strength that is compliant with a second power standard when the determined geographic location of the transmitter antenna corresponds to a second geographic location that is different from the first geographic location, and the second field strength being greater than the first field strength and non-compliant with the first power standard.

2. A method as in claim 1, wherein said wireless power transfer is configured to be carried out at at least one of a frequency of 13.56 MHz +/−7 kHz and a frequency below 135 kHz.

3. A method as in claim 1, wherein said wireless power transfer system generates electromagnetic fields that are higher than electromagnetic fields allowed by the first power standard in areas of the first geographic location where a person cannot be located.

4. A method as in claim 1, wherein said wireless power transfer system generates fields at levels that are based on both biological effects and interference effects with other electronic devices.

5. A method as in claim 1, wherein the first power standard is set to avoid a first biological effect, wherein the second power standard is set to avoid a second biological effect, the method further comprising generating an electromagnetic field during substantially non-radiative energy transmission of the wireless power transfer system at a third filed strength set to comply with a third power standard when the transmitter is located in the first geographic location, wherein the third power standard is different than the first power standard, and wherein the third field strength is greater than the first field strength.

6. A method as in claim 1, wherein the electromagnetic field has a field strength below a standard safety level of the determined geographic location.

7. A method as in claim 1, wherein the field strength of the electromagnetic field is at a level that avoids a corresponding biological effect.

8. The method of claim 1, wherein the first field strength corresponds to an electromagnetic field generated at a first frequency, the method further comprising generating an electromagnetic field during substantially non-radiative energy transmission of the wireless power transfer system at a second frequency and at a third field strength set to comply with the first power standard, the third field strength being greater than the first field strength.

9. The method of claim 1, further comprising adjusting at least one of said first field strength and said second field strength based on an input entered into said transmitter for complying with a power standard, said power standard corresponding to said input.

10. The method of claim 9, wherein said input is at least one of a predefined country code and a code embedded in an electrical tip, said electrical tip being placed on said transmitter.

11. The method of claim 1, wherein transferring said power comprises transferring said power through a multidirectional antenna via said substantially non-radiative electromagnetic field.

12. The method of claim 1, wherein transferring said power comprises transferring said power through a capacitively loaded dipole, wherein said capacitively loaded dipole comprises a wire loop, said wire loop having at least one loop of a coil in series with a capacitor.

13. The method of claim 1, wherein generating the substantially non-radiative electromagnetic field comprises generating a frequency of the field that is tuned to the antenna and is configured for FCC compliance.

14. The method of claim 1, wherein the antenna is an inductively loaded electrical dipole that is at least one of an open capacitor or dielectric disk.

15. A wireless power transfer system, comprising:

a transmitter configured to receive power from a power source and generate a substantially unmodulated signal; and an antenna coupled to the transmitter and configured to receive the substantially unmodulated signal and generate a substantially non-radiative electromagnetic field that transfers power to a rechargeable battery of a wireless power receiver, the transferred power being at a level sufficient for charging the rechargeable battery, wherein the electromagnetic field is adjusted to have a field strength that complies with a standard safety level at a determined geographic location of the transmitter antenna, the electromagnetic field having a first field strength that is compliant with a first power standard when the determined geographic location of the transmitter antenna corresponds to a first geographic location and having a second field strength that is compliant with a second power standard when the determined geographic location of the transmitter antenna corresponds to a second geographic location that is different from the first geographic location, and the second field strength being greater than the first field strength and non-compliant with the first power standard.

16. A system as in claim 15, wherein said transmitter is also compliant with a third power standard set by a third standards standard-setting agency set forth for a third geographic location.

17. A system as in claim 15, wherein said wireless power transfer is configured to be carried out at at least one of a frequency of 13.56 MHz +/−7 kHz and a frequency below 135 kHz.

18. A system as in claim 15, wherein said transmitter generates an electromagnetic field corresponding to a field strength that is higher than the first power standard in an area of the first geographic location where a user cannot be located.

19. A system as in claim 15, wherein said transmitter is configured to generate the electromagnetic field to comply with a standard correlated with interference effects of the electromagnetic field.

20. A system as in claim 15, wherein the first power standard is set to avoid a first biological effect, wherein the second power standard is set to avoid a second biological effect, and wherein the transmitter is further configured to generate an electromagnetic field during substantially non-radiative energy transmission of the wireless power transfer system to comply with a third power standard set to avoid a third biological effect when the transmitter is located in the first geographic location, and wherein the third power standard is greater than the first power standard.

21. A system as in claim 15, further comprising:

an attachable unit configured to adjust the electromagnetic field.

22. A system as in claim 15, wherein the electromagnetic field has a field strength below both the first power standard and second power standard to avoid a corresponding to a biological effect.

23. The system of claim 15, wherein the first field strength corresponds to an electromagnetic field generated at a first frequency, and wherein the transmitter is configured to, when in operation, generate an electromagnetic field during substantially non-radiative energy transmission of the wireless power transfer system at a second frequency and at a third field strength set to comply with the first power standard, the third field strength being greater than the first field strength.

24. The system of claim 15, wherein said transmitter further adjusts at least one of said first field strength and said second field strength, based on an input received by said transmitter, for complying with a third power standard, said power standard corresponding to said input.

25. The system of claim 24, wherein said input is at least one of a predefined country code entered into said transmitter and a code embedded in an electrical tip and sensed by said transmitter, said electrical tip being placed on said transmitter.

26. The system of claim 15, wherein said transmitter further comprises a multidirectional antenna and transfers said power through said multidirectional antenna.

27. The system of claim 15, wherein said transmitter further comprises a dipole and transfers said power through said dipole, wherein said dipole is formed of a wire loop, said wire loop having at least one loop of a coil.

28. The system of claim 27, wherein said dipole further comprises a capacitor.

29. The system of claim 15, wherein the transmitter further comprises a frequency generator, the frequency generator tuned to the antenna and configured for FCC compliance.

30. The system of claim 15, wherein the antenna is an inductively loaded electrical dipole that is at least one of an open capacitor or dielectric disk.

31. The system of claim 15, wherein the antenna further comprises an inductive loop and a high Q resonant antenna part, the inductive loop substantially inductively coupled to the high Q resonant antenna part.

32. The system of claim 15, wherein the wireless power receiver comprises a receiving antenna and a rectifier, the rectifier configured to rectify an output of the receiving antenna.

33. A wireless power transfer system, comprising:

means for receiving power from a power source and for generating a substantially unmodulated signal; and means for receiving the substantially unmodulated signal and for generating a substantially non-radiative electromagnetic field that transfers power to a rechargeable battery of a wireless power receiver, the transferred power being at a level sufficient to charge the rechargeable battery via the substantially unmodulated signal and the substantially non-radiative electromagnetic field, wherein the electromagnetic field is adjusted to have a field strength that complies with a standard safety level at a determined geographic location of the generating means, the electromagnetic field having a first field strength that is compliant with a first power standard when the determined location of the generating means corresponds to a first geographic location and having a second field strength that is compliant with a second power standard when the determined location of the generating means corresponds to a second geographic location that is different from the first geographic location, and the second field strength being greater than the first field strength and non-compliant with the first power standard.

34. A system as in claim 33, wherein the means for generating an electromagnetic field comprises a transmit coil, and wherein the means for transferring power comprises a controller.

* * * * *